United States Patent [19]
Vandenboom et al.

[11] Patent Number: 6,014,900
[45] Date of Patent: Jan. 18, 2000

[54] Z-AXIS RESISTOR TEST SYSTEM

[75] Inventors: Robert M. Vandenboom, Markle; David L. Poole, Portland, both of Ind.; Steven L. Steinbrunner, Coldwater, Ohio; Lewis L. Seffernick, Decatur, Ind.

[73] Assignee: CTS Corporation

[21] Appl. No.: 09/120,917

[22] Filed: Jul. 22, 1998

[51] Int. Cl.[7] .................................................. G01B 7/16
[52] U.S. Cl. .............................................. 73/781; 73/842
[58] Field of Search ............................. 73/763, 774, 781, 73/796, 827, 842

[56] References Cited

U.S. PATENT DOCUMENTS

| | | |
|---|---|---|
| 3,816,812 | 6/1974 | Alber et al. ........................... 324/712 |
| 3,934,463 | 1/1976 | Venderjagt . |
| 4,803,888 | 2/1989 | Choquet ............................. 73/862.392 |
| 4,810,950 | 3/1989 | Young ..................................... 324/708 |
| 5,571,954 | 11/1996 | Ernst ........................................... 73/81 |

*Primary Examiner*—Max Noori
*Attorney, Agent, or Firm*—Mark P. Bourgeois

[57] ABSTRACT

A test system for performing a test of strain gauge resistors used on a pointing stick. The test system has a mechanical load applicator that holds the resistor and applies a mechanical force to the resistor. An electrical contactor makes and breaks an electrical connection with the resistor. An electrical tester is connected to the electrical contactor to measure electrical parameters of the resistor with and without the mechanical force. A calculator is connected to the tester and calculates several resistor parameters. The resistor parameters are indicative of the operation of the pointing stick.

18 Claims, 3 Drawing Sheets

Z-AXIS RESISTOR TEST SYSTEM

BACKGROUND OF THE PREFERRED EMBODIMENT(S)

1. Field of the Preferred Embodiment(s)

This invention generally relates to the manufacture and testing of resistors. Specifically, there is a test system for z-axis strain gauge resistors on a ceramic substrate used in pointing devices for controlling the positioning, movement and operation of a cursor on a display screen. The z-axis resistors act as the activation button for selecting items on the display screen by tapping on the pointing stick instead of clicking on a mouse button.

2. Description of the Related Art

Various devices are well known for controlling cursor movement over a computer display screen of a computer and for signaling a choice of computer command identified by the position of the cursor on the display screen menu.

Manufacturers of portable laptop computers, recognizing the need for placing the cursor controlling device in a permanent and more convenient location, installed a small stubby, button-like joystick centrally around the keys of the computer keyboard, specifically at the juncture of the "g," "h" and "b" keys of the standard "QWERTY" keyboard. The joystick, also known as a pointing stick, was sensitive to lateral pressure, the amount and direction of which were sensed and input into the computer to cause movement of the cursor, and the speed and direction of cursor movement corresponded to the amount and direction of pressure on the joystick. However, the manufacturer has to provide upwardly extending "mouse" or "click" buttons somewhere on the computer.

It is desirable to be able to allow the user to both control the cursor movement and select items on the display using exclusively a pointing stick device. In other words, to allow the user dual control by using only one finger while allowing the remaining fingers to reside on the home row of the standard keyboard.

An exemplary design for a pointing stick is detailed in pending patent application Ser. No. 08/756202 entitled, "Z-axis sensing pointing stick with base as strain concentrator", owned by the same assignee of record of the instant application and is herein incorporated by reference. The 08/756202 application shows details in FIG. 1 of a z-axis pointing stick with a ceramic substrate having strain gauge resistors on all four sides.

The resistors have a voltage and current applied to it during operation supplied from associated electronic circuits on the computer or other device. The four resistors for sensing X and Y cursor movement are arranged in two half wheatstone bridges. The balanced bridge serves to keep the total resistance constant between the applied voltage and ground during X and Y cursor movement. The depression of the pointing stick causes a decrease in resistance of the entire bridge. The static resistance across the bridge is nominally 3200 ohms. For the electronic circuits to sense a click or depression of the pointing stick, the z-axis output has to be maintained at a specified level. Typically, the resistance change when the pointing stick is depressed is very small. For example, in the z-axis resistors described in patent application Ser. No. 08/123456 the resistance changes 1.15 ohms for a 3200 ohm resistance across the bridge. This is 0.9 part per million per gram applied. This is a very small resistance change, 0.036% of the resistance value for the 3200 ohm resistance, x grams of force applied, for example, 400 grams.

In order to maintain a tolerance on the resistance change, a change in resistance ranging from 0.97 ohms to 1.32 ohms must be accurately measured. This is a range of 0.34 ohms. An 11.52 million error in measurement results in a error of 1 percent of the tolerance. Similarly, an error is introduced if the 400 gram weight is not accurate. When a voltage is applied to the resistor, the temperature of the resistor rises and the resistance can change. This problem must be considered in holding the tolerance during testing.

The small resistance change when the pointing stick is depressed and a tight tolerance in the allowable resistance range of the pointing stick results in difficulty in testing the z-axis resistors during manufacturing. The needed test system must be able to measure accurately and precisely and at the same time maintain the required test parameters. Further the test system must be able to quickly and rapidly be able to test large volumes of resistors. The test system also needs to be compact and low cost.

DESCRIPTION OF RELATED ART

Examples of patents related to the present invention are as follows, wherein each patent is herein incorporated by reference for related and supporting teachings:

U.S. Pat. No. 3,934,463 is a hardness tester.

The foregoing patent reflects the state of the art of which the applicant is aware and is tendered with the view toward discharging applicants' acknowledged duty of candor in disclosing information that may be pertinent in the examination of this application. It is respectfully stipulated, however, that this patent does not teach or render obvious, singly or when considered in combination, applicants' claimed invention.

SUMMARY OF THE PREFERRED EMBODIMENT(S)

It is a feature of the invention to provide a test system for performing a test of one or more strain gauge resistors. The test system has mechanical load application means for holding the resistors and applying a mechanical force to the resistor. The mechanical load application means also operates to remove the mechanical force from the resistors. An electrical contact means makes and breaks electrical contacts with the resistors. An electrical measurement means is connected to the electrical contact means for measuring resistance with and without the mechanical force.

The test system also has a calculation means that is connected to the electrical measurement means and operates to receive electrical measurements from the electrical measurement means and calculates a plurality of resistor parameters which are indicative of the functionality of the resistors. It is another feature of the invention to determine weather the resistors pass or fail the test.

It is another feature of the invention to provide a method of testing strain gauge resistors. The method includes holding the resistor in a fixture; applying a load to the resistor using a mechanical load application device; making electrical connection to the resistors using an electrical contact; measuring resistance of the resistor under load using an electrical measurement device connected to the electrical contact; removing the load from the resistor; and measuring resistance of the resistor without the load using the electrical measurement device.

The invention resides not in any one of these features per se, but rather in the particular combination of all of them herein disclosed and claimed and it is distinguished from the prior art in this combination of all of its structures for the functions specified.

There has thus been outlined, rather broadly, the more important features of the invention so that the detailed description thereof that follows may be better understood, and so that the present contribution to the art may be better appreciated. There are, of course, additional features of the invention that will be described hereinafter which will form the subject matter of the appended claims. Those skilled in the art will appreciate that the preferred embodiment may readily be used as a basis for designing other structures, methods and systems for carrying out the several purposes of the present invention. It is important, therefore, that the claims are regarded as including such equivalent constructions since they do not depart from the spirit and scope of the present invention.

Further, the purpose of the abstract is to enable the public generally, and especially the scientists, engineers and practitioners in the art who are not familiar with patent or legal terms or phraseology, to find out quickly from a cursory inspection the nature and essence of the technical disclosure of the application. The abstract is neither intended to define the invention of the application, which is measured by the claims, neither is it intended to be limiting as to the scope of the invention in any way.

BRIEF DESCRIPTION OF THE DRAWINGS

These and other features of the invention can best be understood by the following description of the accompanying drawings as follows.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
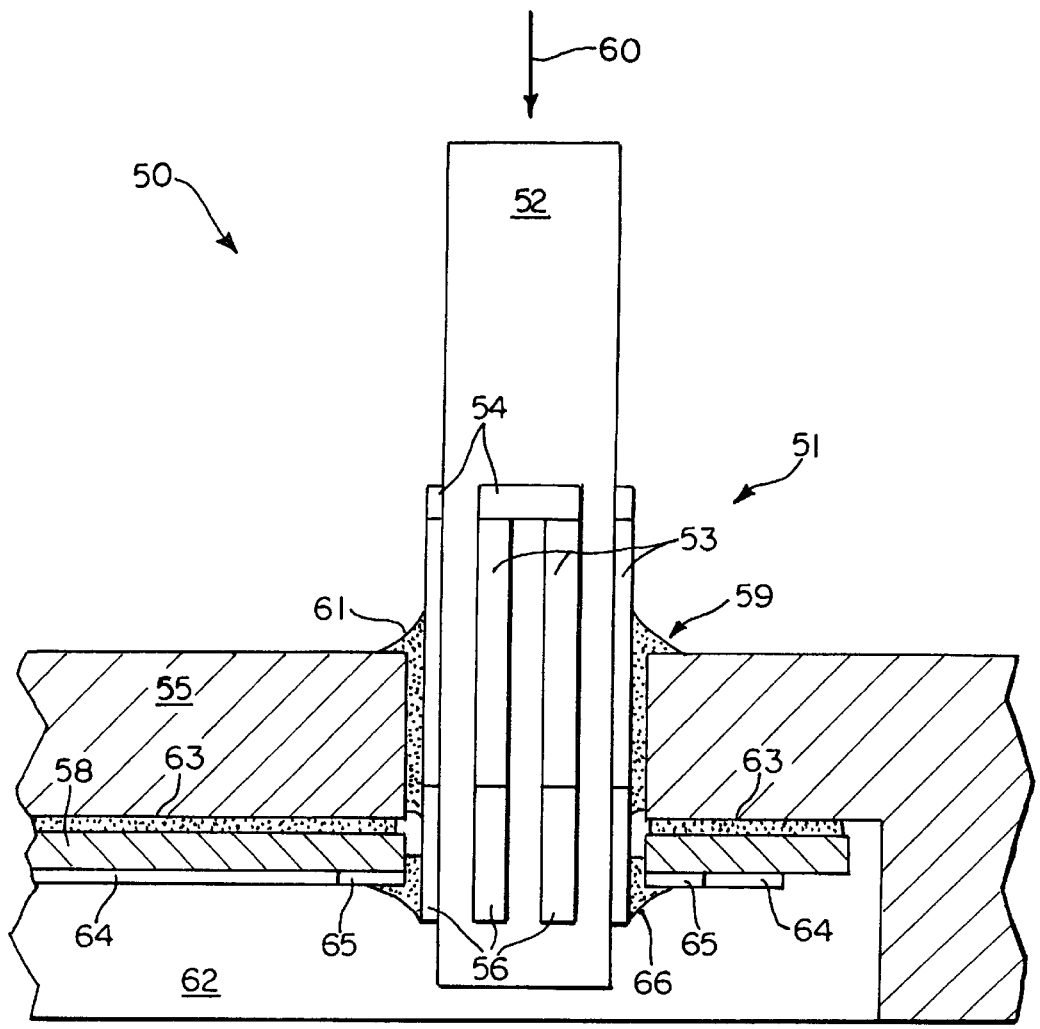
FIG. 1 is a side view of a pointing stick with strain gauge resistors.

Referring to FIG. 1 a side view of a pointing stick 50 with strain gauge resistors is shown. In particular, the following elements are illustrated: Strain gages 51 are mounted on the sides of a stick 52 and are made of strain gauge resistors 53, for electrically changing the resistance of the material in response to the amount of strain applied thereto, a conductive contact bridge 54 for electrically connecting the two resistors 53, and conductive contact pads 56 for making electrical contact to electronic circuitry (not shown) via flexible cable 58. The stick 52 extends through a hole 59 in a z-axis direction 60 in a base or substrate 55, and is held in place by an adhesive bond epoxy 61. Cable 58 is positioned within cavity 62 and is adhesively bonded to the cavity wall via adhesive 63. Cable 58 has electrical traces 64 and input/output (I/O) pads 65 mounted thereon. Contact pads 56 are bonded to I/O pads 65 by any suitable bond material 66, like tin-lead solder.

Figure 2:
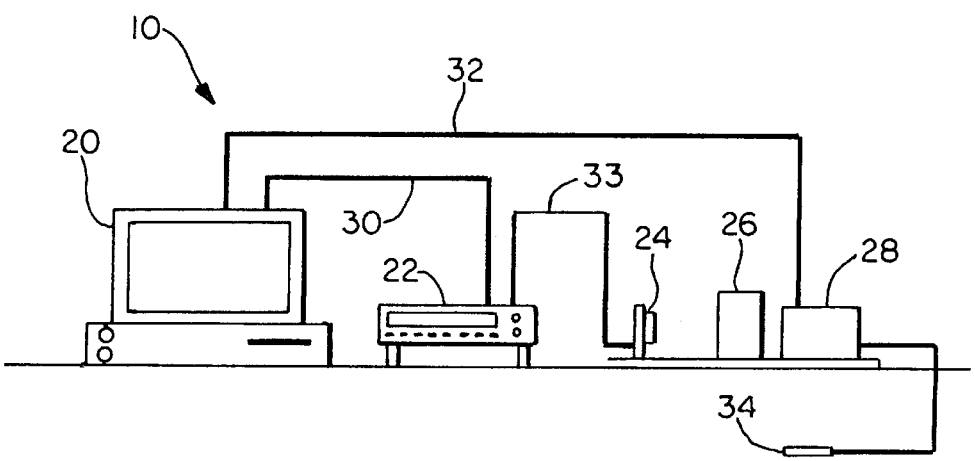
FIG. 2 is a diagrammatic view of a preferred embodiment of a z-axis strain gauge resistor test system.

Referring to FIG. 2, there is a z-axis strain gauge resistor test system 10 that is used to test the resistance value of resistors on the end of pointing stick 50. In particular, the test system 10 is made up of a computer 20 connected by a shielded IEEE-488 cable 30 to a digital multi meter 22. A shielded Kelvin lead 34 connects the digital multi meter 22 to an electrical contact block and actuator 24. A test fixture 26 holds the pointing stick 50 for testing. A test fixture control box 28 is connected to the computer 20 by an input/output cable 32. The test fixture control box 28 is also connected to a foot pedal 34.

The operation of the z-axis strain gauge resistor test system 10 is as follows. A pointing stick 50 to be tested is placed in the test fixture 26. The foot pedal 34 is depressed by an operator to begin the test. Depressing the foot pedal signals the computer 20 to start the test sequence and causes the test fixture control box 28 to actuate the contact block 24 to make electrical contact with flexible cable 58 and lower the 400 gram load onto the stick 52 under test. A hall effect sensor (not shown) signals the control box 28 and the computer that the contact block 24 and the load are in the proper position to perform the test. A signal form the control box 28 is monitored by the computer 20. When the computer 20 detects that the contact block 24 and the load are in position for the test, the computer 20 triggers the digital multi meter 22 to take a loaded voltage reading The voltage value is sent to the computer 20.

Next, the computer 20 signals the control box 28 to lift or remove the 400 gram precision load from the stick 52. Another hall effect sensor (not shown) is positioned to signal the control box 28 and subsequently the computer 20 that the load is removed. The computer 20 then signals the digital multi meter 22 to take an unloaded voltage reading of the bridge. The unloaded voltage reading is sent to the computer 20. The computer 20 then signals the control box 28 to remove the contact block 24. The computer 20 then calculates the parameters of Z-axis output, resistance tolerance, ratio match and makes a determination as to whether the pointing stick 50 passes or fails the test. Details of the calculations will be explained below. After the test is completed, the computer 20 holds the test system 10 in a wait mode, awaiting the foot pedal 34 to be depressed again to start another test sequence.

Figure 3:
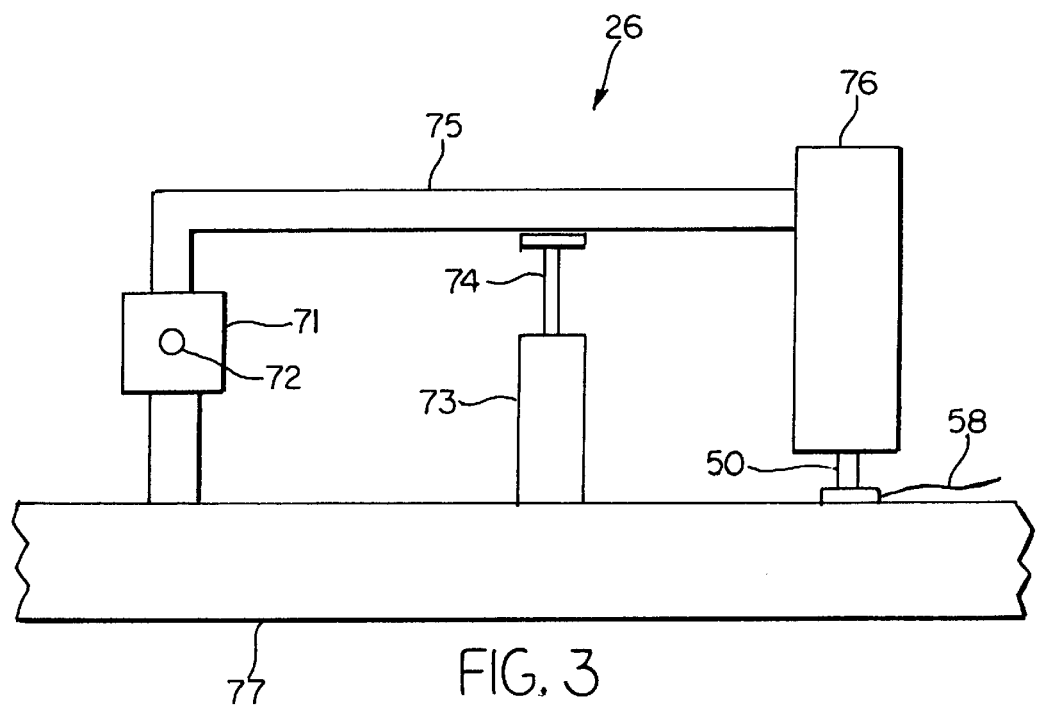
FIG. 3 is a side view of a lever arm test fixture of FIG. 2.

FIG. 3 is a side view of a preferred embodiment of the test fixture 26. A lever arm test fixture 26 is shown resting on a base 77. A pivot 72 is housed by a pivot housing 71. A lever arm 75 connects between pivot 72 and a weight or load 76. A pneumatic or hydraulic cylinder 73 cylinder has a cylinder arm 74. The cylinder arm is raised or lowered which in turn allows the weight 76 to be either entirely supported on the pointing stick 50 or be lifted off of stick 50. The cable 58 is shown in portion as it connects from the lever arm test fixture 26 to the contact block 24.

Figure 4:
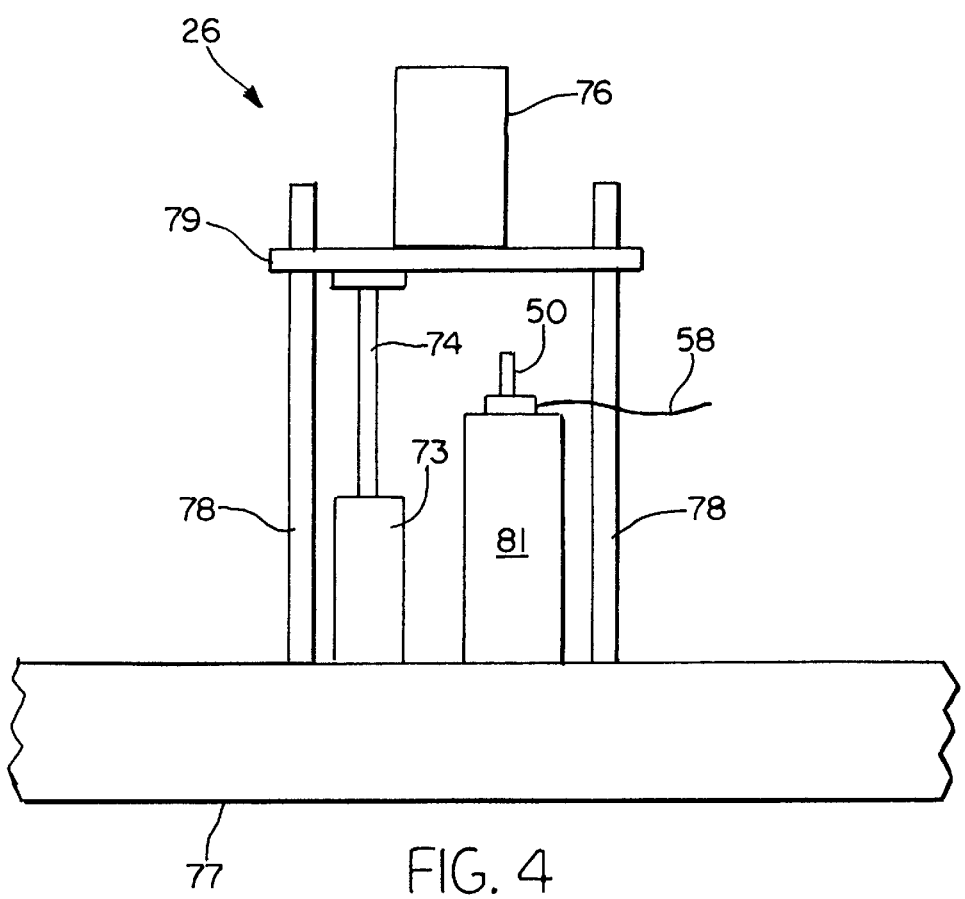
FIG. 4 is a side view of a sliding test fixture of FIG. 2.

FIG. 4 is a side view of an alternative embodiment of the test fixture 26. A slide rail test fixture 26 is shown resting on a base 77. A slide 79 is movably guided by a pair of slide rails 78. A weight or load 76 rests on slide 79. A pneumatic or hydraulic cylinder 73 cylinder has a cylinder arm 74. The pointing stick 50 is supported by a support member 81. The cylinder arm 74 is raised or lowered which in turn allows the weight 76 to be either entirely supported on the pointing stick 50 or be lifted off of stick 50. The cable 58 is shown in portion as it connects from the slide rail test fixture 26 to the contact block 24.

Figure 5:
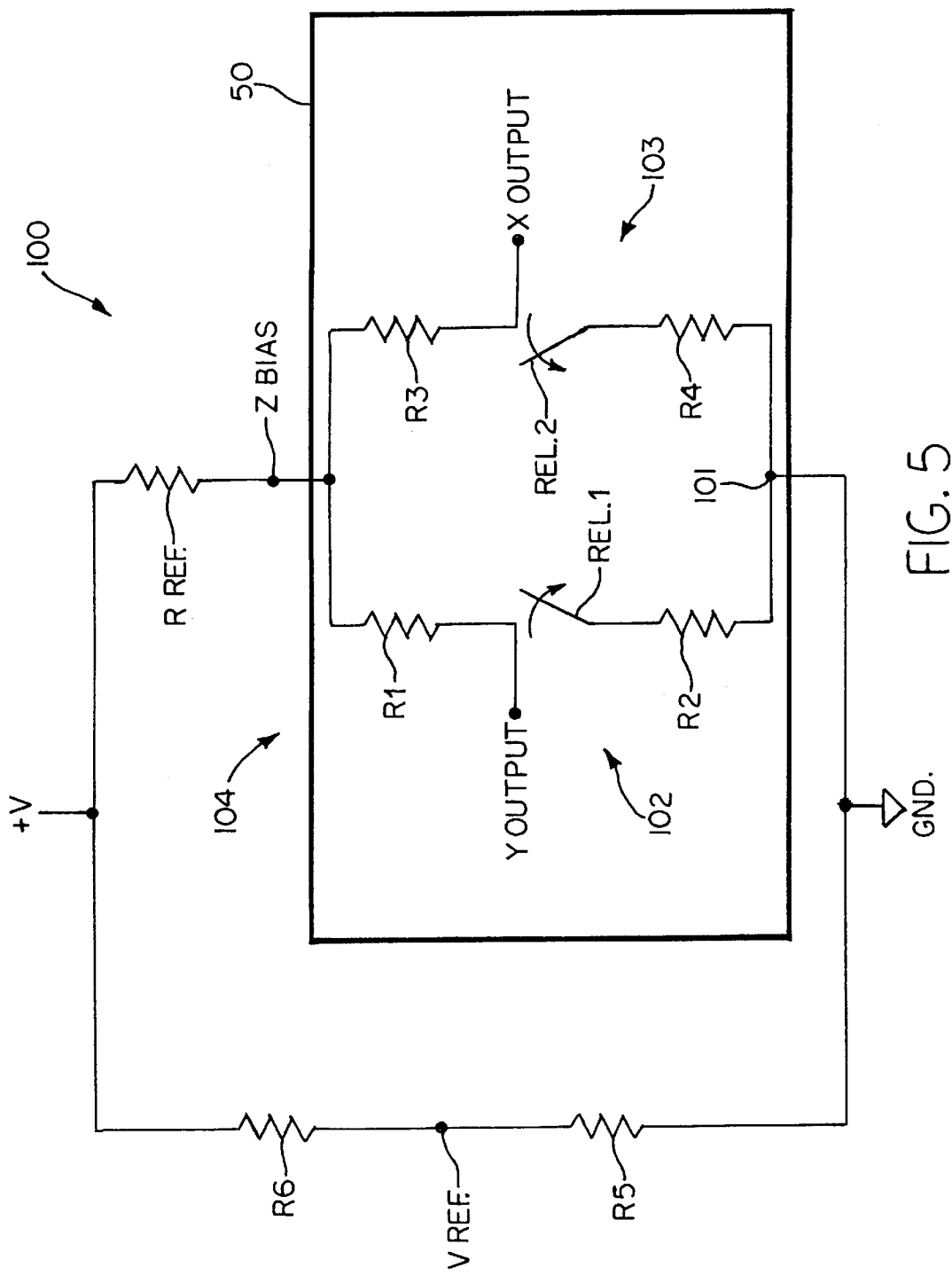
FIG. 5 is an electrical schematic diagram of the resistor test system of FIG. 2.

In reference to FIG. 5, there is an electrical schematic of a bridge circuit 100 for testing the pointing stick incorporating the z-axis strain gauge resistor sensing. Specifically, this circuit shows how the z-axis pointing stick 50 interfaces with digital multi meter 22. The strain sensitive resistors on opposing sides of the stick 52 are configured in two half bridge circuits 102 and 103, The two half bridge circuits form a full wheatstone bridge circuit 104 when relays REL1 and REL2 are closed. Resistors R1 and R2 form a first half bridge, and resistors R3 and R4 form the second half bridge. A fixed resistor Rref is connected between the supply voltage +V of the system and node Zbias. The X output and Y output are shown. The Z output is the same as the Zbias node. A node 101 is connected to ground GND. Node 101 is also connected to a resistor R5. Resistor R5 is connected to node Vref which is connected to resistor R6. R5 and R6 are typically 15 K ohm precision resistors. Resistor R6 is then connected with the supply voltage +V and Rref.

The X and Y axis outputs are developed when an X or Y directional force is applied to the pointing stick 50. For example, when a force is applied in the X direction, the R3 and R4 strain sensitive resistors change resistance in opposite directions and cause an output change. The same is true for the Y -axis. A Z-axis output is developed when a Z-axis force is applied to the top of the stick 52. Force in the Z-axis direction causes the overall resistance between node Zbias and node 101 to decrease. The lower resistance causes a voltage change in the Z output since the series resistor Rref is fixed.

Rref is equivalent to the specified value of the bridge resistance which causes the voltage in the non-loaded state between Vref and Zbias to be zero. This is done to allow the meter to be placed in a lower voltage range giving the measurement more resolution. The z-axis measurement is measured as a differential voltage between the Vref node and the Zbias node when a 400 gram weight is applied to the top of the post of the pointing stick.

The Z-axis output can be calculated as a microvolt/volt/gram output or as a part per million per gram resistance change. The microvolt/volt/gram output is microvolt (uv) output differential per volts (v) applied to the +V node per grams (g) of force applied to the top of the pointing stick. To reduce measurement errors associated with fluctuations in the power supply, the voltage +V is measured and used in the calculation. The Z-axis output is given by the equation:

Z-axis output=(Vzbias−Vref)/+V/400 grams

A typical value of the z-axis output is 0.225 uv/v/g. The z-axis output in part per million per gram resistance change is calculated by the following equation:

$$\text{Z-axis output} = \frac{(\text{Resistance unloaded} - \text{Resistance loaded})}{\text{Resistance unloaded}} \times \frac{1{,}000{,}000}{\text{Applied force in grams}}$$

For a 400 gram force or load the equation is simplified to:

$$\text{Z-axis output} = \frac{(\text{Resistance unloaded} - \text{Resistance loaded})}{\text{Resistance unloaded}} \times 2500$$

A typical value of the z-axis output is 0.9 ppm/g. Since the Rref is equivalent to the specified bridge resistance, the voltage at z-bias must be ½ the supply voltage +V. This is used to measure the bridge resistance to tolerance. The voltages at the Xoutput and Y output nodes must be ½ of the voltage measured at Zbias if the resistors R1, R2, R3 and R4 are properly matched.

The four resistors for sensing X and Y cursor movement are arranged in a balanced wheatstone bridge. The balanced bridge serves to keep the total resistance constant between the applied voltage +V and ground GND during X and Y cursor movement. The depression of the pointing stick causes a decrease in resistance of the entire bridge. The static resistance across the bridge is nominally 3200 ohms. For the electronic circuits to sense a click or depression of the pointing stick, the z-axis output has to be maintained at a specified level. Typically, the resistance change when the pointing stick is depressed is very small. For example, in a typically z-axis resistor, the resistance changes 1.15 ohms for a 3200 ohm resistance across the bridge. This is a very small resistance change, 0.036% of the resistance value for the 3200 ohm resistance.

In order to maintain a tolerance, resistance ranging from 0.97 ohms to 1.32 ohms must be accurately measured. This is a range of 0.34 ohms. An 11.52 million error in measurement results in a error of 1 percent%. Similarly, an error is introduced if the 400 gram weight is not accurate.

It is preferable that the supply voltage +V be strobed or pulsated during testing both in the loaded and unloaded states. This reduces the measurement error caused by the resistors heating up and changing resistance value. In a preferred embodiment, the voltage is applied for a period of time less than or equal to the measurement time. A typical time period for applying the voltage is 130 milliseconds.

Additional tests can be performed by the test system 10. A 10 mega-ohm short test is performed by opening a set of relays REL1 and REL2 shown in FIG. 5 and located in the test circuit 100. This test measures the resistance between the X and Y portions of the Bridge 102 and 103, to determine if there are any electrical shorts between the two sides of the bridge.

The X and Y cursor movement is controlled by changing voltage levels at the X and Y outputs of the pointing device due to strain being induced in the resistors as a result of pushing the stick sideways. It is not acceptable for the cursor to move when no force is applied to the pointing stick. This movement without force being applied is known as cursor drift. A ratio mis-match between resistors or an unstable resistor could result in cursor drift. This can be detected by measuring the voltage level at the X and Y outputs at two different times and comparing the measurements to see if there is any change over time. A determination is then made as to if the outputs differ enough to cause a problem.

Remarks About the Preferred Embodiment

One of ordinary skill in the arts of test systems and more particularly the art of designing resistor or strain gauge test systems will realize many advantages from using the preferred embodiment. In particular, a skilled artisan will realize that the test system can be readily automated and result in a high capacity test system that is capable of rapidly testing many pointing sticks. The test system can also be manufactured for a low cost.

Additionally, a skilled artisan will understand that the test system is capable of repeated precisely applying and removing the weight from the pointing stick in a rapid manner and as such eliminating measurement errors from this source.

It is further noted that a skilled artisan would realize that the test system is capable of now performing testing without the measurement errors due to the heating of the resistors during testing because the strobing or pulsating of the test voltage applied to the resistors prevents the effects of the resistance varying resistance due to the temperature coefficient of resistance.

Variations of the Preferred Embodiment(s)

One of ordinary skill in the art of designing test systems will realize that there are many different ways of accomplishing the preferred embodiment. For example, although it is contemplated to use a computer 20, a programmable logic controller or a micro controller could also be used. Additionally, digital multi meter 22 could be an analog type meter.

Although it is illustrated that the weight is actuated with a cylinder arm 74, it is equally contemplated to use other types of lateral displacement mechanisms such as a solenoid or a cam and eccentric shaft. Similarly, other types of force application mechanisms could be used instead of a weight such as a pneumatic bellows or any device that can both apply and remove a defined weight.

Even though, the embodiment discusses measuring strain gauge resistors, it is contemplated to use the invention for measuring other devices to which a force is needed to be applied. For example digital scales and other testers.

Additionally, even though the illustrated embodiment shows using a full bridge circuit 100 to test the pointing stick 50. It is contemplated to use other circuit configurations to test the pointing stick 50. For example, one half bridge could be used. Further, the test system could be utilized to measure a single resistor.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by Letters Patent is:

1. A test system for performing a test of at least one resistor, comprising:
   a) mechanical load application means for holding the resistor and both applying and removing a mechanical force to and from the resistor, respectively;
   b) electrical contact means for making and breaking electrical contact with the resistor; and
   c) electrical measurement means, connected to the electrical contact means, for making electrical measurements with and without the applied mechanical force.

2. The test system according to claim 1, further comprising:
   calculation means connected to the electrical measurement means, for receiving electrical measurements from the electrical measurement means and thereby calculating a plurality of resistor parameters indicative of the functionality of the resistor.

3. The test system according to claim 2, wherein the calculation means is operable to determine weather the resistor passes or fails the test.

4. The test system according to claim 1, wherein the mechanical load application means further comprises:
   a) a weight disposed adjacent the resistor;
   b) a slide attached to the weight; and
   c) an air cylinder supporting the slide and operable to move the slide such that the air cylinder loses contact with the slide as the slide is moved, the slide and weight resting on the resistor and applying the mechanical force.

5. The test system according to claim 4, wherein the slide has a post connecting to the weight in order to center the weight on the slide.

6. The test system according to claim 1, wherein the mechanical load application means further comprises:
   a) a weight disposed adjacent the resistor;
   b) a lever arm attached to the weight; and
   c) an air cylinder supporting the lever arm and operable to move the lever arm such that the air cylinder loses contact with the lever arm as the lever arm is moved, the lever arm and weight resting on the resistor and applying the mechanical force.

7. The test system according to claim 1, wherein the electrical contact means is a contact block and an actuator.

8. The test system according to claim 1, wherein the electrical measurement means is a voltage meter.

9. The test system according to claim 2, wherein the calculation means is a personal computer.

10. The test system according to claim 2, wherein the plurality of resistor parameters calculated includes:
    a) part per million per gram resistance change;
    b) resistance tolerance;
    c) ratio match;
    d) passing resistor; and
    e) failing resistor.

11. The test system according to claim 10, wherein the part per million per gram resistance change is calculated by the equation:

$$\frac{(\text{Resistance unloaded} - \text{Resistance loaded})}{\text{Resistance unloaded}} \times \frac{1{,}000{,}000}{\text{Applied force in grams}}.$$

12. The test system according to claim 1, wherein a first and a second resistor are electrically connected at a first node and a third and fourth resistor are electrically connected at second node, the test system further operable to electrically connect the first and second nodes and measure a voltage across the bridge.

13. The test system according to claim 1, wherein the voltage measurement is performed within a short duration in order to avoid overheating of the resistor.

14. A method of testing at least one resistor comprising the steps of:
    a) holding the resistor in a fixture;
    b) applying a load to the resistor using a mechanical load application device;
    c) making electrical connection to the resistors using an electrical contact;
    d) measuring voltage of the resistor under load using an electrical measurement device connected to the electrical contact;
    e) removing the load from the resistor; and
    f) measuring voltage of the resistor without the load using the electrical measurement device.

15. The method of testing at least one resistor according to claim 14 further comprising the step of:
    f) calculating a plurality of resistor parameters from the voltage measurement, the resistor parameters indicative of the functionality of the resistor.

16. The method of testing at least one resistor according to claim 15 further comprising the step of:
    g) determining if the resistor passes or fails the test based on the resistor parameters.

17. The method of testing at least one resistor according to claim 14, wherein a first and a second resistor are electrically connected at a first node and a third and fourth resistor are electrically connected at second node, the test system is further operable to electrically connect the first and second nodes and measure a bridge voltage.

18. The test system according to claim 14, wherein the voltage measurement is repeatedly performed with each measurement having a short duration in order to avoid overheating of the resistor.

* * * * *